United States Patent
Thubert et al.

(10) Patent No.: US 9,930,049 B2
(45) Date of Patent: Mar. 27, 2018

(54) METHOD AND APPARATUS FOR VERIFYING SOURCE ADDRESSES IN A COMMUNICATION NETWORK

(71) Applicant: CISCO TECHNOLOGY, INC., San Jose, CA (US)

(72) Inventors: Pascal Thubert, La Colle sur Loup (FR); Eric Levy-Abegnoli, Valbonne (FR); Shweta Choudaha, Reading (GB); Julien Grobbelaar, Surrey (GB); Matthew King, Hampshire (GB)

(73) Assignee: Cisco Technology, Inc., San Jose, CA (US)

( * ) Notice: Subject to any disclaimer, the term of this patent is extended or adjusted under 35 U.S.C. 154(b) by 289 days.

(21) Appl. No.: 14/598,869

(22) Filed: Jan. 16, 2015

(65) Prior Publication Data

US 2016/0212150 A1 Jul. 21, 2016

(51) Int. Cl.
*G06F 7/04* (2006.01)
*G06F 17/30* (2006.01)
*H04N 7/16* (2011.01)
*H04L 29/06* (2006.01)

(52) U.S. Cl.
CPC .......... *H04L 63/126* (2013.01); *H04L 63/162* (2013.01); *H04L 63/062* (2013.01)

(58) Field of Classification Search
CPC .................. H04L 63/1483; H04L 63/126
See application file for complete search history.

(56) References Cited

U.S. PATENT DOCUMENTS

| 8,925,084 B2 | 12/2014 | Thubert et al. | |
|---|---|---|---|
| 2005/0125692 A1* | 6/2005 | Cox | H04L 63/0272 726/4 |
| 2007/0053334 A1* | 3/2007 | Sueyoshi | H04L 12/2856 370/338 |
| 2007/0260884 A1* | 11/2007 | Venkitaraman | H04L 29/1232 713/169 |
| 2009/0260083 A1* | 10/2009 | Szeto | H04L 63/0263 726/22 |
| 2014/0237544 A1* | 8/2014 | Higuchi | H04L 63/0884 726/3 |

OTHER PUBLICATIONS

"RFC 4862—IPv6 Stateless Address Autoconfiguration", Sep. 2007, https://tools.ietf.org/search/rfc4862.*

(Continued)

*Primary Examiner* — Catherine Thiaw
*Assistant Examiner* — Quy Pham
(74) *Attorney, Agent, or Firm* — Cindy Kaplan

(57) ABSTRACT

In one embodiment, a method includes receiving a packet from an end node, the packet comprising an authenticated source MAC (Media Access Control) address and a source IP (Internet Protocol) address computed based on the authenticated source MAC address, and verifying the source IP address in the received packet, wherein verifying the source IP address comprises computing an IP address based on the authenticated source MAC address and comparing the computed IP address to the source IP address in the received packet to verify the source IP address. An apparatus is also disclosed herein.

20 Claims, 4 Drawing Sheets

(56) References Cited

OTHER PUBLICATIONS

IETF RCF 6620, E. Nordmark et al., "FCFS SAVI: First-Come, First-Served Source Address Validation Improvement for Locally Assigned IPv6 Addresses", May 2012.
IETF RFC 3972, T. Aura, "Cryptographically Generated Addresses (CGA)", Mar. 2005.
IETF RFC 4861, T. Narten et al., "Neighbor Discovery for IP version 6 (IPv6)", Sep. 2007.
IETF RFC 3971, J. Arkko et al., "Secure Neighbor Discovery (SEND)", Mar. 2005.

* cited by examiner

METHOD AND APPARATUS FOR VERIFYING SOURCE ADDRESSES IN A COMMUNICATION NETWORK

TECHNICAL FIELD

The present disclosure relates generally to communication networks, and more particularly, to verification of source addresses in a communication network.

BACKGROUND

Various technologies may be used to authenticate and authorize a layer 2 (L2) MAC (Media Access Control) address within an L2 network without any association to layer 3 (L3) address utilization. A user may have its MAC address validated and authorized, but still act as a malicious L3 user, stealing IP (Internet Protocol) addresses from others, announcing a large number of IP addresses to exhaust some network resources (e.g., ARP (Address Resolution Protocol) or ND (Neighbor Discovery) cache), binding table), or using the IP address beyond its lifetime.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
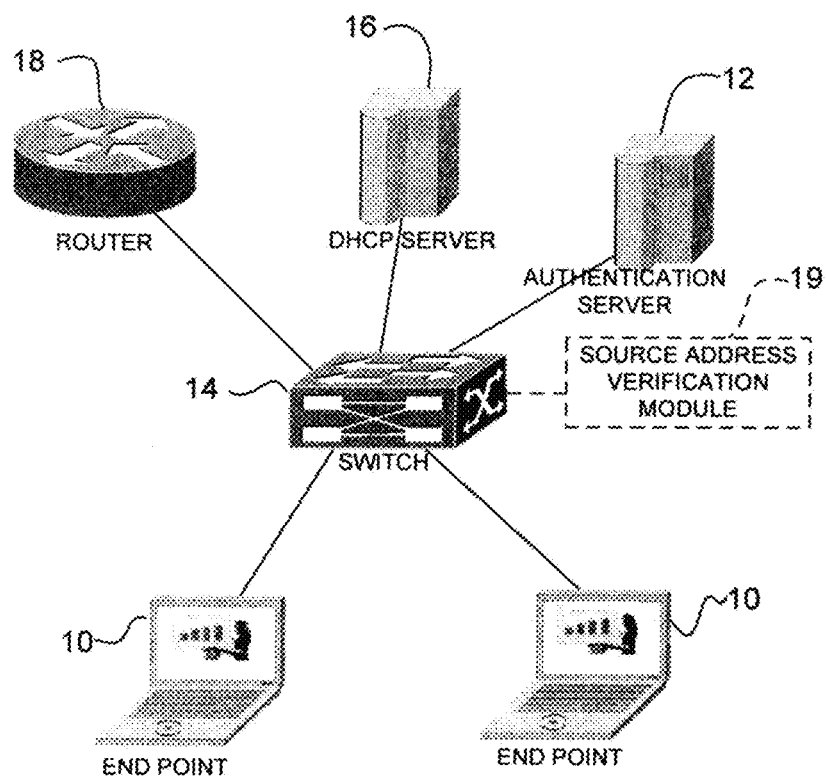
FIG. 1 illustrates an example of a network in which embodiments described herein may be implemented.

In one embodiment, a method generally comprises receiving a packet from an end node, the packet comprising an authenticated source MAC (Media Access Control) address and a source IP (Internet Protocol) address computed based on the authenticated source MAC address, and verifying the source IP address in the received packet, wherein verifying the source IP address comprises computing an IP address based on the authenticated source MAC address, and comparing the computed IP address to the source IP address in the received packet to verify the source IP address.

In another embodiment, an apparatus generally comprises a processor for processing a packet received from an end node, the packet comprising an authenticated source MAC (Media Access Control) address and a source IP (Internet Protocol) address, computing an IP address based on the authenticated source MAC address, and comparing the computed IP address to the source IP address in the received packet to verify the source IP address. The apparatus further comprises memory for storing a key used to compute the IP address.

In yet another embodiment, an apparatus generally comprises an interface for communication with an end node, memory for storing a key associated with the end node, and a source address verification module for identifying an authenticated source MAC (Media Access Control) address and a source IP (Internet Protocol) address in a packet received from the end node, computing an IP address based on the authenticated source MAC address and the key, and comparing the computed IP address to the source IP address in the received packet to verify the source IP address.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Secure Neighbor Discovery (SeND), as disclosed in IETF RFC 3971 (J. Arkko et al., "Secure Neighbor Discovery (SeND)", March 2005), enables end users to prove layer 3 (L3) address ownership, however, it is not associated with any layer 2 (L2) authorization that may have taken place. Having cryptography deployed at L2 and at L3 independently results in complexity, additional overhead, and only protects ND (Neighbor Discovery) messages, not traffic. There is no mechanism to limit the number of addresses or tie an already authenticated MAC address with an IP address. As a consequence, SeND carries its own cryptographic material, thereby increasing complexity. For these reasons SeND is not typically deployed. Additionally, SeND proves ownership of an address but does not authorize that address in the network. In other words, SeND protects ownership against a rogue take-over of an address, regardless of whether the owner of the address is a rogue device.

Source guard provides some address ownership protection, including data traffic, but does not provide strong validation of any kind Binding guard ensures that no more than a given number of addresses (based on policy) are used at the same time off a given access port. Both of these features are stateful. Also, a binding table with all known addresses is needed, which results in a large software (performance) and hardware (memory) cost. While these implementations may be capable of limiting the number of addresses allowed per user, it is at the cost of storing active addresses, which in large L2 networks can be thousands of addresses.

The embodiments described herein enable the verification of an IP source address by tying a computation of the IP address to an authenticated MAC address. The embodiments provide a security feature that restricts IP traffic on untrusted ports and helps to prevent IP spoofing attacks where a host tries to spoof and use the IP address of another host. Certain embodiments allow for control of the number of addresses allowed by the end node and their lifetime, in a stateless manner, without storing MAC or IP addresses in the network device (e.g., switch) performing the verification. One or more embodiments tie strong MAC authentication/authorization with IP authorization without the need to deploy an IP authorization infrastructure, or carry L3 credentials in all traffic. The embodiments may be configured to prevent any revert computation, such as computing the MAC address from the IP address.

Referring now to the drawings, and first to FIG. 1, an example of a network in which embodiments described herein may be implemented is shown. The embodiments operate in a communication network comprising a plurality of network devices. For simplification, only a small number of nodes and links are shown. The network may include any number of network devices (e.g., routers, switches, servers, access layer devices, aggregation layer devices, gateways, or other network devices), which facilitate passage of data within the network. For example, data flow paths between the nodes may include any number or type of intermediate nodes and communication links. The nodes may communicate over a LAN (Local Area Network) or any other type of network (or networks).

The example shown in FIG. 1 includes a plurality of end nodes (clients, stations) 10 in communication with an authentications server 12 via a network device (e.g., switch) 14. The end nodes 10 may also be in communication with a DHCP (Dynamic Host Configuration Protocol) server 16 or router 18. The router 18 may be, for example, a default gateway on the same LAN as the switch.

The end node 10 may be, for example, a desktop computer, laptop computer, IP phone, server, appliance, game console, printer, camera, sensor, mobile phone, tablet, personal digital assistant, or any other device configured for communication within the network. The end node 10 may be a managed or unmanaged device. For example, a user may attempt to access a network from a corporate-managed personal computer, personal network-accessible device, or public terminal. The end node 10 may be a wired device or wireless device, or configured for both wired communication (e.g., connected to a docking station) and wireless communication.

The switch 14 may be any network device operable to perform forwarding functions (e.g., network device comprising network switching or routing elements configured to perform forwarding functions (e.g., L2, L3, or L2/L3 device)). The switch 14 may communicate with any number of end nodes 10 or other switches. In the example shown in FIG. 1, the switch 14 is a first hop switch (FSH) as viewed from the end node 10. The switch 14 includes memory for storing parameters (e.g., key, count, lifetime) received from the DHCP server 16 or router 18. As described in detail below, a source address verification module 19 at the switch 14 uses the parameters to compute IP addresses for verification of the source addresses in packets received from the end node 10. Since the IP addresses are calculated at the switch 14, there is no need to store active IP addresses at the switch.

The switch 14 is operable to verify an IP address against a MAC address, which is authenticated with a known authentication method (e.g., IEEE 802.1X (Port Based Network Access Control), also referred to as Dot 1X authentication). It is to be understood that IEEE 802.1X is referred to herein as one example of an authentication method and that other MAC address authentication methods may be used, as noted below.

The authentication server 12 may comprise, for example, one or more access directory, access control server, AAA (authentication, authorization and accounting) server/proxy, policy server, application server, controller, security manager, client profile manager, or any other node, combination of nodes, or source (e.g., network administrator) that provides authentication or policy information for the end nodes 10. The authentication server 12 may use, for example IEEE 802.1x, EAP (Extensible Authentication Protocol), EAPoUDP (EAP over User Datagram Protocol), Web Portal authentication, RADIUS (Remote Authentication Dial in User Service), Diameter, or any other authentication scheme.

As described in detail below, the end node 10 is assigned one or more IP addresses. In certain embodiments, the address is a result of a computation (e.g., hash) of parameters, including, for example, the end node's authenticated MAC address, a key, and an optional count if more than one address is derived from the same key. The count is the number of simultaneous addresses allowed at the end node 10 (e.g., 1, 2, 3 . . . ).

The term 'key' as used herein may refer to an encryption key, pass phrase (e.g., one or more words), or any other suitable identifier. The key does not need to be secret, but it needs to be known by the entity assigning the address (e.g., end node 10, DHCP server 16) and the entity verifying the address (e.g., switch 14). The knowledge of that key is only useful for a node that is connected to the network and the key is only used to derive IP addresses (e.g., IPv6 (IP version 6) addresses) from a MAC address and validate that afterwards. As described below, the key may be provided by the DHCP server 16 (e.g., in a DHCP reply), router 18 (e.g., in a router advertisement), or other network device in communication with the switch 14 and end node 10.

There may be more than one key, each with a different elapse time, so as to deprecate them, and the derived addresses, at different times, with the capability to roll out a new key before old ones are deprecated. The entity assigning the address and the entity verifying the address are aware of the collection of keys and deprecation time for each, using a protocol such as an extension to the ND (Neighbor Discovery) RA (Router Advertisement), the Extensible Authentication Protocol (EAP), or the DHCP protocol, for example. In one approach, the key may be allocated by an EAP server at the time of the MAC address authorization, and be specific to that particular MAC address. In that case, an additional protocol element indicating the MAC address is added for the entity assigning the address and the entity verifying the address to obtain the key on a per MAC address basis. The entity assigning the address may be the end node 10 (e.g., in a SLAAC (Stateless Address Autoconfiguration implementation), the DHCP server 16, or other network device.

It is to be understood that the network shown in FIG. 1 and described above is only an example and the embodiments described herein may be implemented in networks comprising different network topologies or network devices, or using different protocols, without departing from the scope of the embodiments. For example, the network may include any number or type of network devices that facilitate passage of data over the network (e.g., routers, switches, gateways), network elements that operate as endpoints or hosts (e.g., servers, virtual machines, clients), and any number of network sites in communication with any number of networks.

Figure 2:
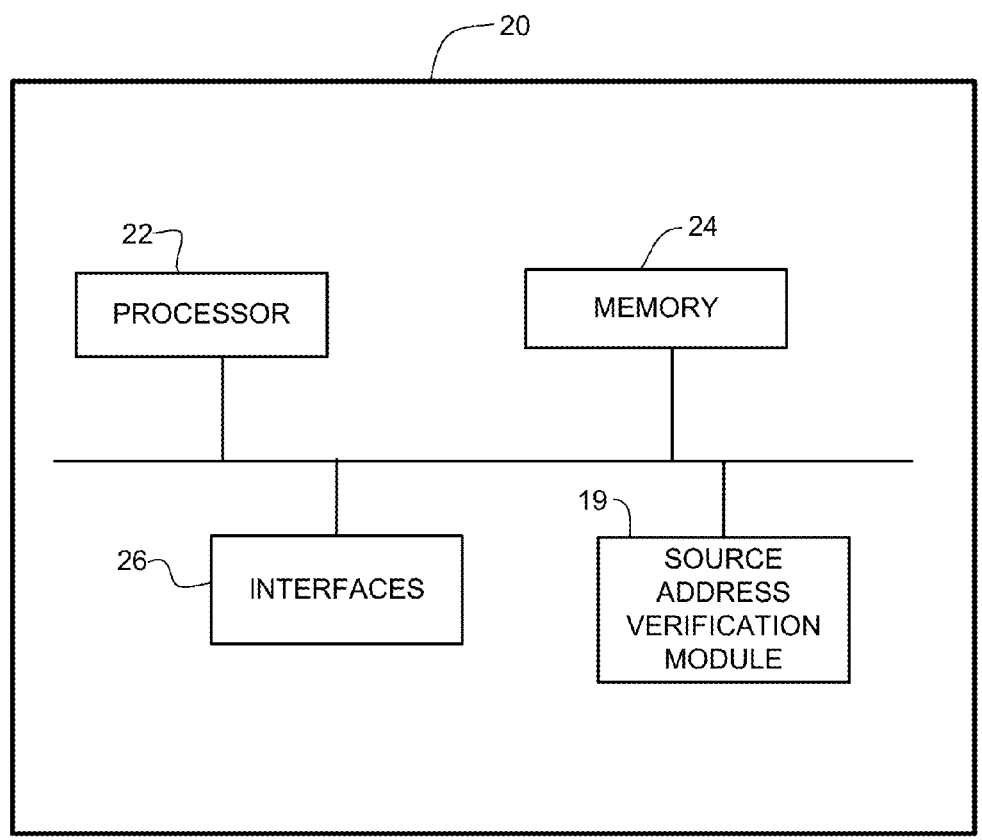
FIG. 2 depicts an example of a network device useful in implementing embodiments described herein.

FIG. 2 illustrates an example of a network device 20 (e.g., first hop switch 14 in FIG. 1) that may be used to implement the embodiments described herein. In one embodiment, the network device 20 is a programmable machine that may be implemented in hardware, software, or any combination thereof. The network device 20 includes one or more processor 22, memory 24, network interfaces 26, and the source address verification module 19 (e.g., hardware, software components).

Memory 24 may be a volatile memory or non-volatile storage, which stores various applications, operating systems, modules, and data for execution and use by the processor 22. Memory 24 may include, for example, a forwarding information base, a table for storing verification parameters (e.g., key, lifetime, count) (shown in FIGS. 3 and 4 and described below), or any other data structure. One or more components of the source address verification module 19 (e.g., code, logic, software, etc.) may also be stored in memory 24. The network device 20 may include any number of memory components.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 20 may include any number of processors 22.

The network interfaces 26 may comprise any number of interfaces (linecards, access ports) for receiving data or transmitting data to other devices. The network interface 26 may include, for example, an Ethernet interface for connection to a computer or network. The network interfaces 26 may be configured to transmit or receive data using a variety of different communication protocols. The interfaces 26 may include mechanical, electrical, and signaling circuitry for communicating data over physical links coupled to the network.

It is to be understood that the network device 20 shown in FIG. 2 and described above is only an example and that different configurations of network devices may be used. For example, the network device 20 may further include any suitable combination of hardware, software, algorithms, processors, devices, components, modules, or elements operable to facilitate the capabilities described herein.

Figure 3:
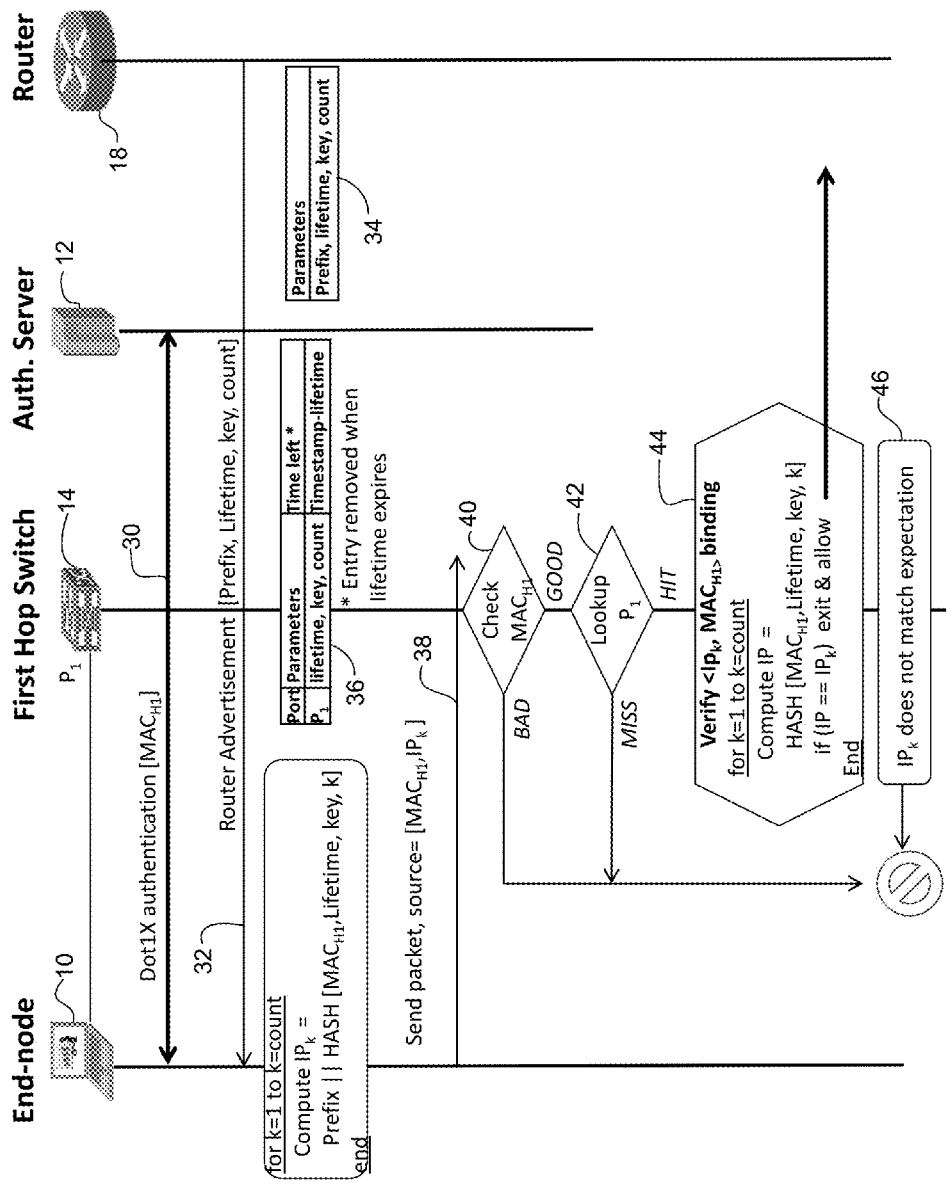
FIG. 3 illustrates an example of a process flow in the network of FIG. 1 with SLAAC (Stateless Address Autoconfiguration), in accordance with one embodiment.

FIG. 3 illustrates communication between the end node 10, switch 14, authentication server 12, and router 18 in the network of FIG. 1 in an SLAAC deployment, in accordance with one embodiment. As shown at arrow 30, authentication of end node address ($MAC_{H1}$) is performed between the end node 10 and authentication server 12. In this example, the end node 10 is provided parameters 34, including a prefix, key (or keys), lifetime of each key, and a count (maximum number of allowed addresses) by the router 18 (e.g., via router advertisement 32). This information is also stored at the switch 14 at table 36. In the example shown in FIG. 3, the table 36 has an entry for port $P_1$, which includes parameters (lifetime, key, count) and the time left indicated by a timestamp, for example. The table 36 may include any number of entries. The entry may be removed when the lifetime expires. As previously noted, there does not need to be one key per end user, so the amount of states stored for verification can be concise. The lifetime of a key in the router advertisement may be computed dynamically so as to be the time left to a certain date at which time the key will be deprecated and the addresses derived from that key will be barred.

After the MAC address has been authenticated (as indicated at 30) and the end node 10 receives the parameters in the router advertisement 32, the end node 10 may compute the linked part of the IP address. In one example, the end node 10 uses a hash to compute the IP address. The hash function may be, for example, a SHAx (Secure Hash Algorithm 0, 1, 2, 3, etc.) or any other type of hash. In order to generate more than one address, the end node 10 may include a counter in the hash. The counter may vary from one to k (where k=count) to obtain k addresses (after concatenation with the prefix). The end node 10 may then compute $IP_k$ for k=1 to k=count as follows:

Prefix∥HASH [$MAC_{H1}$, Lifetime, key, k]

It is to be understood that other calculations may be used to generate the IP address, without departing from the scope of the embodiments.

After computing the IP addresses, the end node 10 begins to source with these addresses. As shown at arrow 38, the end node 10 transmits a packet with source address=[$MAC_{H1}$, $IP_k$]. In order to verify the source address, the first hop switch 14 reads the MAC address out of layer 2 (authenticated) and the IP address out of layer 3, and retrieves the key, lifetime, and count from local states. The switch 14 first checks the MAC address (step 40) and if the address is good, next performs a lookup on port $P_1$ (step 42). If there is a hit, the end node 10 performs the same hash function (MAC, key, k=1 to count) as was performed by the end node 10 (step 44). The end node 10 verifies that the IP source address in the packet matches the result of the IP address computation. In one example, 64 bits of the hash may be used as the IID (interface identifier) in an IPv6 address. Other variations may be used. If the IP source address in the packet matches the computed IP address, the packet is allowed. Otherwise it is dropped (step 46). The validation of a given address may be cached, and it may be programmed in some hardware filters (e.g. a TCAM (Ternary Content Addressable Memory)), and eventually associated with a source MAC address, a switch port and lifetime, so as to improve the validation of the source IP address for the next packets.

Figure 4:
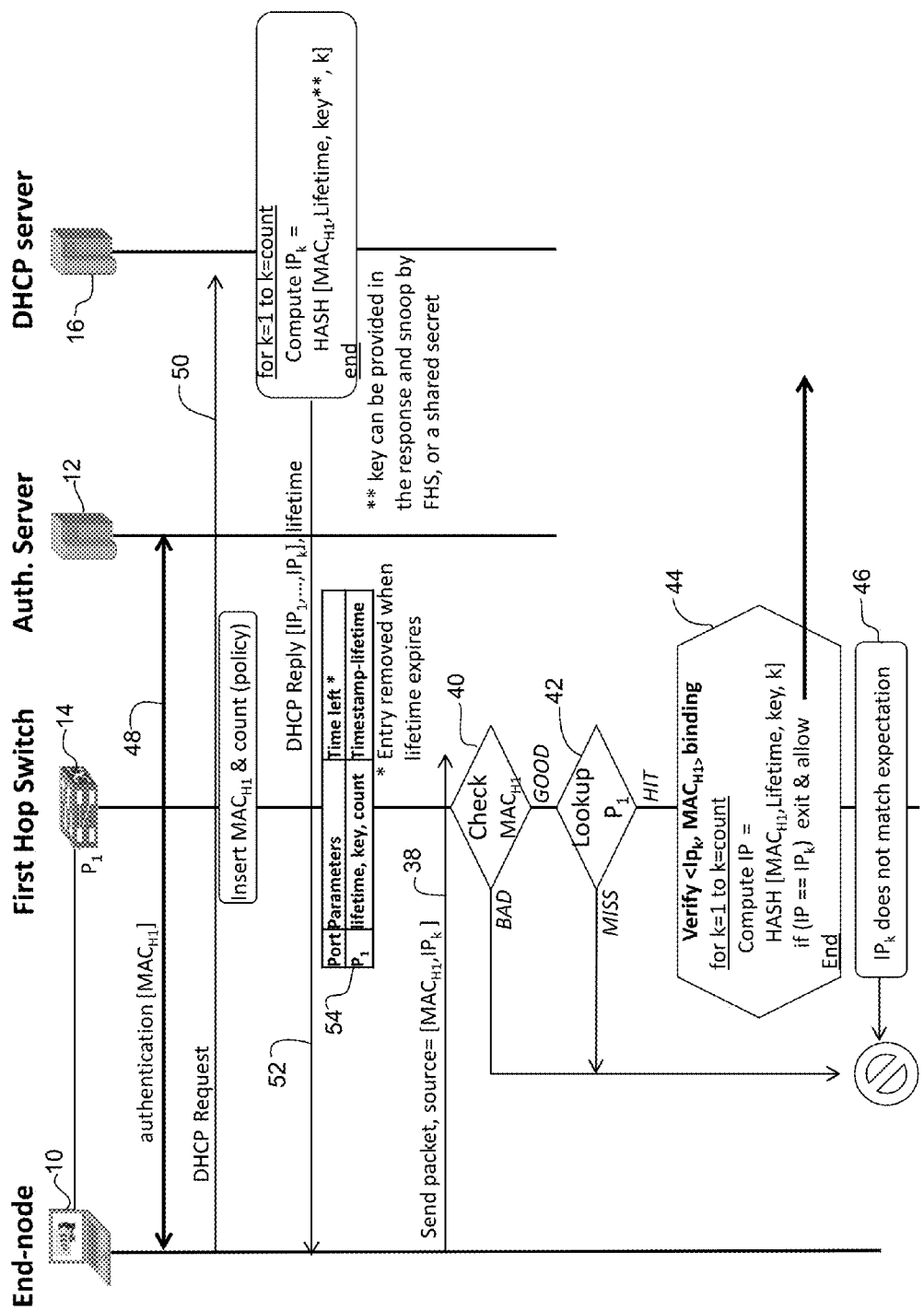
FIG. 4 illustrates an example of a process flow in the network of FIG. 1 with DHCP (Dynamic Host Configuration Protocol), in accordance with one embodiment.

FIG. 4 illustrates communication between the end node 10, switch 14, authentication server 12, and DHCP server 16 in the network of FIG. 1 for a DHCP deployment, in accordance with one embodiment. The end node 10 and authentication server 12 perform authentication of the MAC address, as described above (indicated at arrow 48). The end node 10 transmits a DHCP request to the DHCP server 16 (indicated at arrow 50). The computations performed by the end node 10 to calculate the IP addresses in FIG. 3 are performed by the DHCP server 16 in the implementation shown in FIG. 4. The end node's MAC address used for the computation is either extracted from the client ID or inserted by the first hop switch 14 into the request (e.g., acting as a LDRA (Lightweight DHCP Relay Agent)). The DHCP server 16 transmits the IP address to the end node 10 in a DHCP reply 52. The key may be provided in the response and snooped by the first hop switch 14 or a shared secret may be used. The parameters are stored at table 54 at the switch 14. When the end node 10 transmits a packet with a source address=[$MAC_{H1}$, $IP_k$], the same verification process is performed at the switch 14 as described above with respect to FIG. 3 (steps 40-46). The method shown in FIG. 4 has the advantage of not impacting the end nodes 10, therefore, it may be quickly deployed.

It is to be understood that the processes shown in FIGS. 3 and 4, and described above, are only examples and that steps may be added, combined, or modified without departing from the scope of the embodiments.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
receiving at a switch, a packet from an end node, the packet comprising a source MAC (Media Access Control) address authenticated by a server in communication with the end node and a source IP (Internet Protocol) address computed at the end node based on said authenticated source MAC address, wherein authentication of said source MAC address is performed between the end node and the server;
processing the packet by the switch, wherein processing the packet comprises computing by the switch, an IP address based on a hash of said authenticated source MAC address and a key, and comparing by the switch, said IP address computed by the switch with said source IP address computed at the end node;
verifying by the switch, said source IP address in the received packet based on a match of said IP address computed by the switch and said source IP address in the received packet;
forwarding the packet from the switch following verification of said source IP address; and
storing said verification that said source IP address matches said IP address computation result at the switch and programming a filter at the switch for use in validating source IP addresses for packets received at the switch.

2. The method of claim 1 further comprising storing at the switch, the key used to compute said IP address at the switch.

3. The method of claim 2 further comprising receiving the key in a router advertisement.

4. The method of claim 2 further comprising receiving the key from a DHCP (Dynamic Host Configuration Protocol) server.

5. The method of claim 2 further comprising storing a lifetime for the key and removing the key when said lifetime expires.

6. The method of claim 2 further comprising storing a plurality of keys, each of said keys assigned a lifetime.

7. The method of claim 2 wherein computing said IP address at the switch comprises computing a hash of said authenticated source MAC address and the key.

8. The method of claim 1 further comprising storing a count identifying a maximum number of allowed source IP addresses for the end node.

9. The method of claim 1 wherein the MAC address is authenticated by an authentication server in communication with the end node.

10. The method of claim 1 further comprising receiving another packet from the end node, the packet comprising said authenticated source MAC address and a new source IP address, and verifying said new source IP address.

11. An apparatus comprising:
a processor for processing a packet received from an end node, the packet comprising a source MAC (Media Access Control) address authenticated by a server in communication with the end node and a source IP (Internet Protocol) address computed at the end node based on said authenticated source MAC address, computing an IP address based on a hash of said authenticated source MAC address and a key, comparing said IP address computed by the apparatus to said source IP address computed at the end node and received in the packet, verifying said source IP address based on a match of said IP address computed by the apparatus and said source IP address in the received packet, forwarding the packet following verification of said source IP address, and programming a filter for use in validating source IP addresses for packets received at the apparatus; and
memory for storing the key used to compute said IP address and said verification that said source IP address matches said IP address computation result;
wherein authentication of said source MAC address is performed between the end node and the server, and verification of said source IP address received from the end node is performed at the apparatus.

12. The apparatus of claim 11 wherein the memory is configured to store a count identifying a maximum number of allowed source IP addresses for the end node.

13. The apparatus of claim 11 wherein the apparatus is configured to obtain the key from a router advertisement.

14. The apparatus of claim 11 wherein apparatus is configured to obtain the key from a DHCP (Dynamic Host Configuration Protocol) reply message.

15. The apparatus of claim 11 wherein the memory is configured to store a lifetime for the key and the processor is further operable to remove the key when said lifetime expires.

16. The apparatus of claim 11 wherein the memory is configured to store a plurality of keys, each of said keys comprising a lifetime.

17. The apparatus of claim 11 wherein computing said IP address comprises computing a hash of said authenticated source MAC address and the key.

18. An apparatus comprising:
an interface for communication with an end node;
memory for storing a key associated with the end node; and
a processor for processing a packet received from the end node, wherein processing comprises:
reading a source MAC (Media Access Control) address authenticated by a server in communication with the end node and a source IP (Internet Protocol) address computed at the end node based on said authenticated source MAC address;
computing an IP address based on a hash of said authenticated source MAC address and the key;
comparing said IP address computed by the apparatus to said source IP address in the received packet;
verifying said source IP address in the received packet based on a match of said IP address computed by the apparatus and said source IP address in the received packet;
forwarding the packet following verification of said source IP address;
storing said verification that said source IP address matches said IP address computation result in memory; and
programming a filter at the apparatus for use in validating source IP addresses for packets received at the apparatus;
wherein authentication of said source MAC address is performed between the end node and the server, and verification of said source IP address received from the end node is performed at the apparatus.

19. The apparatus of claim 18 wherein the memory is configured to store a count identifying a maximum number of allowed source IP addresses for the end node.

20. The apparatus of claim 18 wherein the apparatus is configured to receive the key from an EAP (Extensible Authentication Protocol) server over RADIUS (Remote Authentication Dial in User Service) or Diameter protocol extensions.

\* \* \* \* \*